UNITED STATES PATENT OFFICE.

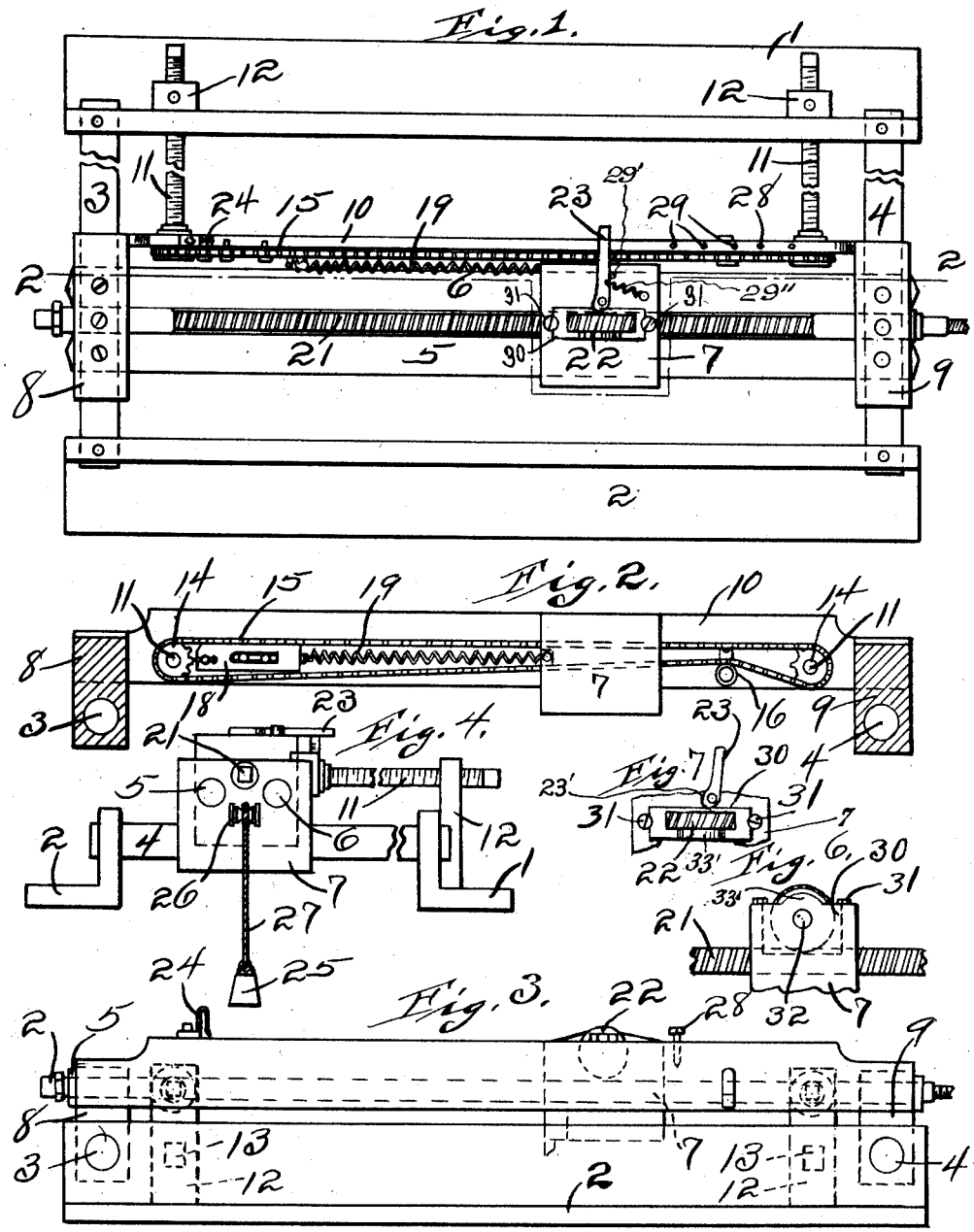

JAMES J. MOONEY AND RICHARD E. BENNETT, OF WICHITA FALLS, TEXAS.

PORTABLE LOCOMOTIVE-VALVE-SEATING MACHINE.

1,385,344.   Specification of Letters Patent.   Patented July 19, 1921.

Application filed August 4, 1919.   Serial No. 315,067.

*To all whom it may concern:*

Be it known that we, JAMES J. MOONEY and RICHARD E. BENNETT, both citizens of the United States of America, residing at Wichita Falls, county of Wichita, and State of Texas, have invented certain new and useful Improvements in Portable Locomotive-Valve-Seating Machines, of which the following is a specification.

Our invention relates to valve seating machines and more particularly to portable locomotive valve seating machines, and the object is to provide machines which are simple in operation and construction and in which the principal parts will operate automatically to reciprocate the traveling tool head longitudinally and also to adjust the carriage for the tool head laterally. Other objects and advantages will be fully explained in the following description and the invention will be more particularly pointed out in the claims.

Reference is had to the accompanying drawings which form a part of this application.

Figure 1 is a plan view of the machine. Fig. 2 is a vertical section, taken substantially on the line 2—2 of Fig. 2. Fig. 3 is a side elevation of the machine. Fig. 4 is an end elevation, the end on the right side of the other figures being shown. Fig. 5 is a detail view of the ratchet mechanism for accomplishing the lateral feed of the tool head. Fig. 6 is a detail view, illustrating the cage for carrying the worm drive wheel. Fig. 7 is a plan view of the same.

Similar characters of reference are used to indicate the same parts throughout the several views.

The machine is provided with a frame consisting of angle bars 1 and 2 and cylindrical bars 3 and 4 rigid with the angle bars 1 and 2. The machine is also provided with two cylindrical guide bars 5 and 6 for the traveling tool head 7. The guide bars 5 and 6 are mounted in blocks 8 and 9 which are adjustable laterally on the bars 3 and 4 by means of the ratchet mechanism hereinafter described. The blocks 8 and 9 are moved laterally by the bar 10 which is rigid with the head blocks 8 and 9. The bar 10 is moved by the screw shafts or bolts 11 which have a revolving connection with the bar 10 and operate through nuts 12 which are bolted to the angle bar 1. The nuts or blocks 12 are bolted to the angle bar 1 by bolts 13. The shafts 11 are turned by sprocket wheels 14 which are rigid therewith and by a sprocket chain 15 which runs on the wheels 14. The machine is provided with a tension regulating device 16 for the chain 15. The chain 15 is driven by a pawl and ratchet mechanism. A pawl or pin 17 is movably attached to a movable bar 18 which is slidably mounted on the bar 10. Bolts project through a slot in the bar 18 into the bar 10 and the heads of the bolts prevent the bar 18 from leaving its place. The pin 17 is yieldable in only one direction from the normal position and stands in the path of the traveling head. In the last inch of travel of this head in making its forward stroke, it will engage the pin 17 which stands in engagement with the chain 15 and so move the pin and the chain this last inch. As soon as this stroke is completed the chain 15 will stop and stand until the head 7 makes another forward move. As soon as the head 7 releases the pin 17, a retractile spring 19 which is attached to the bar 10 and to the sliding bar 18 will draw the bar 18 back to starting point, a spring 20 will let the pin 17 yield downwardly and trail back under the chain 15 until the pin enters the next link in the chain. This operation goes on as often as the traveling head 7 makes a forward move, each time the head 7 moves the chain 15 one link forward and so turns the chain 15 one link forward. This accomplishes the feed of the tool head 7 laterally.

The traveling tool head 7 is driven or moved by a continuously rotated shaft 21 which has a worm or screw thread thereon. A worm gear wheel 22 is journaled in the block 30 and engages the worm shaft 21. The shaft 21 will drive the wheel 22 and wheel 22 by reason of its journals being mounted in the tool head 7 will move the tool head 7 when the wheel 22 is locked to the tool head 7. Means are provided for locking the wheel 22 to the tool head and for releasing the wheel from the tool head 7. A cam lever 23 is pivotally mounted on the block 7 and in inoperative position stands as shown in the drawings, being held against an upstanding pin 29′ by a weak spring 29″. When the block 7 is moving back to starting position, the lever 23 will strike a pin 28 and this action will incline the lever to the left and lock the lever by means of the cam 23′ on the lever. The lever will stand in the inclined position until the lever 23 strikes the stop 24 and then the lever will come back to the position shown in the drawings. A cam lever 23 locks the wheel 22 in the forward movement of the head 7 until the lever 23 strikes a stop 24 which is attached to the frame member 10. This will release the wheel 22 from head 7. A weight 25 is attached by a cord 27 to the head 7 and the cord 27 runs over an idle pulley 26. As soon as the wheel 22 is released from head 7, the weight 25 will draw the head 7 back to starting point. About the time the head 7 reaches the starting point the lever 23 will strike an upstanding pin or stop 28 and this will cause the lever 23 to lock the wheel 22 again to the tool head. The shaft 21 will commence immediately to move the head 7 forward until the wheel is released from the tool head 7 by the stop 24. These operations will continue automatically as long as the shaft 21 is driven. The shaft 21 may be driven by any suitable power. The pin 28 may be set at different positions, a plurality of holes 29 being made for this purpose. This difference in adjustment is to make allowance for valve seats of different lengths.

Any suitable tool may be carried by the traveling head 7 for operating on valves or other devices. Different tools may be secured to the head 7 and adjusted in the usual manner of adjusting tools in chucks of different types.

The worm wheel 22 is mounted in a cage 30 which is inserted in a slot in the head 7. The cage or block 30 is secured in place by screws 31 which are screwed into the head 7 with the flanges of the screw heads caught over the ends of the block 30. The wheel 22 is provided with shaft 32 which is adjusted before the block 30 is placed in the slot in the head 7. A portion 33' of the block or cage 30 projects up by the wheel 22 to provide more surface against which the wheel 22 is to be pressed by the cam lever 23. The cage 30 is made rigid with the head 7 and when the wheel 22 is to effect a driving of the head 7, the wheel 22 is made rigid with the cage 30. When the head 7 reaches the end of its movement the cam lever 23 will be automatically released so that the weight 25 will draw the head 7 back to starting point.

What we claim, is,—

1. A valve seating machine comprising a frame including longitudinal guide and supporting bars, a traveling tool head movable on said guide bars, means for reciprocating said head on said guide bars including a shaft provided with a worm thread and a worm wheel journaled in said tool head and adapted to mesh with said shaft, means for automatically locking said worm wheel to said tool head and for releasing said wheel from said head, and a counterweight for returning said head to starting point.

2. A valve seating machine comprising a frame including longitudinal guide and supporting bars and a shifting bar, a traveling tool head movable on said guide bars, means for reciprocating said tool head on said guide bars including a worm screw shaft journaled in said frame and a worm gear wheel journaled in said head and adapted to engage said shaft for a forward drive of said tool head and a counterweight for moving said tool back to starting point, and means for automatically locking said worm wheel to said head and for releasing said wheel from said head consisting of a cam lever fulcrumed on said tool head, a stop on said shifting bar near the starting point of said head for causing said lever to lock said worm wheel to said head, and a stop on said shifting bar at the limit of the forward drive of said head for engaging said lever to release said worm wheel from head.

3. A valve seating machine comprising a frame including longitudinal guide bars, end bars and blocks movable on said end bars and carrying said guide bars, a shifting bar rigid with said blocks, a traveling tool head reciprocating on said guide blocks, and means for shifting said guide blocks laterally consisting of nuts rigid with said frame, screw shafts journaled in said shifting bar and operating in said nuts, sprocket wheels rigid with said screw shafts and a sprocket chain running on said wheels, a spring-actuated bar slidably mounted on said shifting bar, a dog movably mounted on said shifting bar in the path of said tool head and moved thereby and adapted to engage said chain and move said chain, and a spring for drawing said spring-actuated bar to starting point, said dog yielding to pass under said chain to the next link therein.

4. A valve seating machine comprising a frame including longitudinal guide and supporting bars, a traveling tool head movable on said guide bars, means for reciprocating said head on said guide bars including a shaft provided with a worm thread and a worm wheel, a cage in which said worm wheel is journaled mounted in said head and rigid therewith, means for automatically locking said worm wheel rigid with said cage and for releasing said worm wheel from said cage, and means for automatically returning said head to starting point.

In testimony whereof, we set our hands this 28th day of July, A. D., 1919.

JAMES J. MOONEY.
RICHARD E. BENNETT.